US009151564B1

(12) United States Patent
Baxter

(10) Patent No.: US 9,151,564 B1
(45) Date of Patent: Oct. 6, 2015

(54) FIREARM TRIGGER PULL TRAINING SYSTEM AND METHODS

(75) Inventor: Malcolm Baxter, Nolensville, TN (US)

(73) Assignee: TriggerMaster, Inc., Nolensville, TN (US)

( * ) Notice: Subject to any disclaimer, the term of this patent is extended or adjusted under 35 U.S.C. 154(b) by 458 days.

(21) Appl. No.: 12/908,420

(22) Filed: Oct. 20, 2010

Related U.S. Application Data

(63) Continuation-in-part of application No. 11/504,313, filed on Aug. 15, 2006, now Pat. No. 8,556,628.

(51) Int. Cl.
*F41A 33/02* (2006.01)
*F41A 19/10* (2006.01)
*F41B 11/57* (2013.01)
*F41G 1/38* (2006.01)
*F41G 3/26* (2006.01)
*F41J 5/08* (2006.01)
*F41J 5/02* (2006.01)

(52) U.S. Cl.
CPC .................. *F41A 33/02* (2013.01); *F41A 19/10* (2013.01); *A63F 2300/8076* (2013.01); *F41B 11/57* (2013.01); *F41G 1/38* (2013.01); *F41G 3/2605* (2013.01); *F41G 3/2655* (2013.01); *F41J 5/02* (2013.01); *F41J 5/08* (2013.01)

(58) Field of Classification Search
CPC ......... F41A 33/02; F41A 19/10; F41A 33/06; F41A 17/46; F41A 19/16; F41A 17/00; F41G 3/2655; F41G 1/38; F41G 3/2605; F41J 5/02; F41J 5/08; A63F 2300/8076; F41B 11/57; G05G 9/047; G09B 19/0038

USPC .................................................. 434/11, 16, 19
See application file for complete search history.

(56) References Cited

U.S. PATENT DOCUMENTS 1,786,614 A 12/1930 Howard
2,077,383 A 4/1937 Foisy
(Continued)

OTHER PUBLICATIONS bullseyepistol.com, "Trigger Control Chapter 3: Army Marksmanship Training Guide", Feb. 23, 2005, bullseyepistol.com, pp. 1-6.*

*Primary Examiner* — Jack Yip
(74) *Attorney, Agent, or Firm* — Waller Lansden Dortch & David, LLP; Matthew C. Cox

(57) ABSTRACT

A firearm training system provides a firearm body having a trigger and a position input circuit. When the trigger is pulled, the position input circuit emits a two-dimensional trigger position signal that allows monitoring of the actual two-dimensional trigger pull path taken by the trigger during the trigger pull. The trigger pull path can be displayed graphically on an electronic device in real time. In other embodiments, the information associated with the trigger position signal can be stored and can be graphically viewed after the trigger pull is complete. The system provides a way to monitor trigger pull path to determine whether the trigger has been pulled laterally. By repeatedly monitoring trigger pulls using the system, a user can train to improve trigger pull technique. Also, a motion sensing circuit disposed on the firearm body can measure movement of the firearm body during the trigger pull, and a barrel displacement indicator can be graphically and numerically displayed on the electronic device corresponding to the actual barrel displacement. A method of providing firearm user input information to a user is also provided.

13 Claims, 11 Drawing Sheets

(56) References Cited

U.S. PATENT DOCUMENTS

| | | |
|---|---|---|
| 2,325,599 A | 8/1940 | Fidelman |
| 2,396,017 A | 3/1946 | Martin |
| 2,559,010 A | 7/1951 | Cutler |
| 3,365,975 A | 1/1968 | Hathaway |
| 3,861,069 A | 1/1975 | Heurlen |
| 4,725,235 A | 2/1988 | Schroeder et al. |
| 4,725,978 A * | 2/1988 | Fujioka .......... 345/179 |
| 4,782,335 A * | 11/1988 | Gussin .......... 345/161 |
| 4,913,655 A | 4/1990 | Pinkley et al. |
| 5,316,479 A | 5/1994 | Wong et al. |
| 5,345,214 A | 9/1994 | Tsui |
| 5,453,758 A | 9/1995 | Sato |
| 5,532,476 A | 7/1996 | Mikan |
| 5,658,238 A | 8/1997 | Suzuki et al. |
| 5,761,954 A | 6/1998 | Dvorak |
| 5,831,596 A | 11/1998 | Marshall et al. |
| 5,847,694 A | 12/1998 | Redford et al. |
| 5,954,507 A | 9/1999 | Rod et al. |
| 6,144,367 A | 11/2000 | Berstis |
| 6,181,327 B1 | 1/2001 | Lin et al. |
| 6,243,077 B1 | 6/2001 | Manara et al. |
| 6,257,893 B1 | 7/2001 | Trabut |
| 6,545,661 B1 | 4/2003 | Goschy et al. |
| 6,672,962 B1 | 1/2004 | Ozaki et al. |
| 6,739,873 B1 | 5/2004 | Rod et al. |
| 6,854,975 B2 | 2/2005 | Ranzinger |
| 7,329,127 B2 | 2/2008 | Kendir et al. |
| 7,587,277 B1 * | 9/2009 | Wells .......... 701/510 |
| 7,774,155 B2 | 8/2010 | Sato et al. |
| 7,813,581 B1 | 10/2010 | Fitzpatrick et al. |
| 8,275,544 B1 | 9/2012 | Wells et al. |
| 8,556,628 B1 | 10/2013 | Baxter |
| 2002/0162193 A1 | 11/2002 | Frys |
| 2002/0174588 A1 | 11/2002 | Danner et al. |
| 2002/0186204 A1 | 12/2002 | Kim |
| 2003/0022716 A1 | 1/2003 | Park et al. |
| 2003/0189547 A1 | 10/2003 | Lee et al. |
| 2003/0221684 A1 | 12/2003 | Rice |
| 2005/0014113 A1 | 1/2005 | Fleck et al. |
| 2005/0021282 A1 * | 1/2005 | Sammut et al. .......... 702/150 |
| 2006/0005447 A1 | 1/2006 | Lenner et al. |
| 2007/0190495 A1 | 8/2007 | Kendir et al. |
| 2008/0105050 A1 | 5/2008 | Kraetz |
| 2009/0233768 A1 * | 9/2009 | Merzenich et al. .......... 482/8 |
| 2009/0262074 A1 | 10/2009 | Nasiri et al. |
| 2011/0118023 A1 | 5/2011 | Fu |
| 2011/0167691 A1 | 7/2011 | Bowman et al. |
| 2012/0330182 A1 | 12/2012 | Alberts et al. |

* cited by examiner

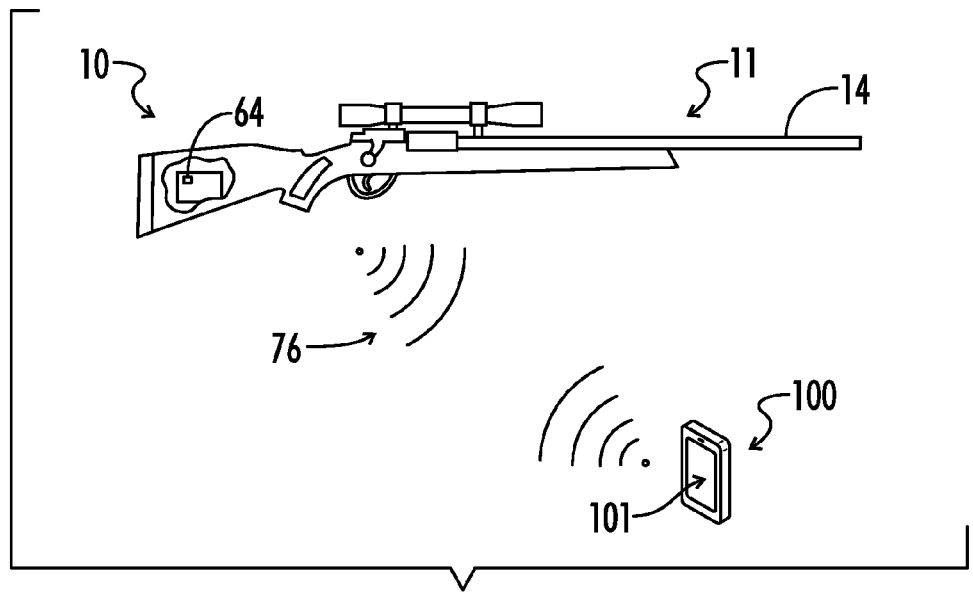
*FIG. 14A*
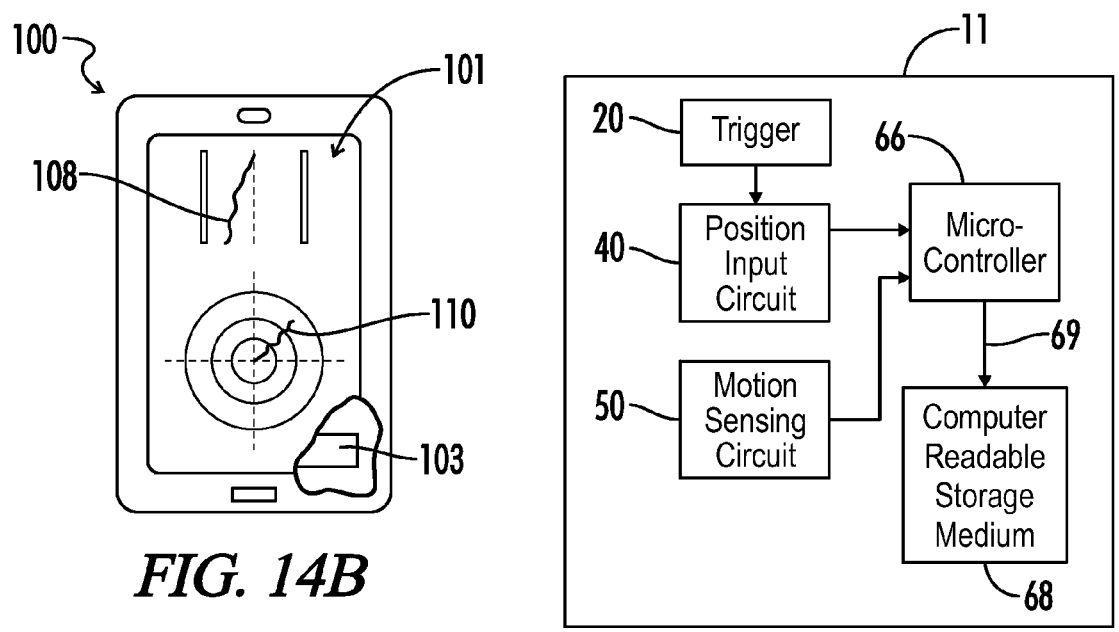
*FIG. 14B*
*FIG. 15*

FIREARM TRIGGER PULL TRAINING SYSTEM AND METHODS

CROSS REFERENCE TO RELATED APPLICATION

This application is a continuation-in-part of co-pending U.S. patent application Ser. No. 11/504,313, filed Aug. 15, 2006, entitled "Shooting Training Device", all of which is incorporated by reference herein.

BACKGROUND

The present invention relates to firearms and more particularly to devices, systems and methods for use with a firearm or a firearm replica for graphically indicating information to a user during or after live or practice firing.

A firearm operator typically provides at least two types of input when operating a firearm. First, the operator generally aims the firearm at a target. Second, the operator typically pulls the firearm trigger using a single finger of the user's hand, thereby activating a firing mechanism in the firearm to discharge one or more projectiles from the firearm barrel toward the target. In some applications, a third type of user input includes applying force to the barrel to keep the barrel steady before and during the trigger pull.

Generally, during the pull of a firearm trigger, the operator applies a pulling force against the trigger in at least two dimensions. First, when the trigger is pulled, a force is applied along a longitudinal trigger axis generally parallel to the longitudinal axis of the barrel. The longitudinal force application causes the trigger to move longitudinally through the trigger track opening toward the rear of the trigger guard. When the trigger has reached a predetermined longitudinal position, the firing mechanism in the firearm is activated and a shot is fired, causing one or more projectiles to be discharged from the firearm.

The second direction of force application against the trigger by the user's hand can occur along a lateral axis oriented substantially perpendicular to the longitudinal axis. Typically, the application of lateral force against the trigger can cause the firearm barrel to move off the desired target in any direction. Such barrel movement is undesirable and causes inaccuracy of the fired shot. Similarly, a firearm operator may inadvertently apply force against the trigger using the operator's finger in a third, generally vertical, direction during a trigger pull, causing the firearm barrel to move up or down relative to the desired target.

Others have attempted to monitor the position of a trigger on a firearm during a trigger pull as a method of training a shooter to improve trigger pull technique. For example, U.S. Pat. No. 4,913,655 teaches a Trigger Pull Measuring Device for and Method of Improving Trigger Pull Technique. Such conventional devices and methods, however, do not monitor actual trigger movement in two dimensions and do not correlate trigger pull path to actual barrel displacement. Such conventional firearm trigger pull monitoring systems are generally placed on an actual firearm and do not constitute a standalone training device. Moreover, conventional firearm trigger pull monitoring systems also generally measure only the one-dimensional force applied to the trigger as a function of longitudinal position and do not provide a graphical display of two-dimensional trigger pull path.

Thus, improvements in systems, devices and methods for training a firearm user to improve trigger pull technique by monitoring trigger pull path in at least two dimensions are needed in the art.

BRIEF SUMMARY

One aspect of the present invention provides a firearm system for graphically indicating a trigger pull path to a user. The system includes a firearm body including a handle and a barrel extending from the handle. The barrel defines a longitudinal barrel axis, and a firearm trigger is disposed on the firearm body. A position input circuit is disposed on the firearm body, and the position input circuit includes a multi-axis position controller mechanically attached to the trigger. The position input circuit emits a trigger position signal representative of the actual two-dimensional trigger pull path taken by the trigger when the trigger is pulled.

Yet another aspect of the present invention provides a firearm system for measuring a trigger pull path. The system includes a firearm body including a barrel defining a longitudinal barrel axis, and the firearm body includes a handle shaped for being gripped by a user's hand. A position input circuit is disposed on the firearm body. The position input circuit includes a position controller having a post extending therefrom. The post is moveable along a first axis and a second axis, and the second axis is oriented substantially perpendicular to the first axis. Movement of the post along a first axis and a second axis can include movement in any direction in a Cartesian coordinate system. A motion sensing circuit is disposed on the firearm body. The motion sensing circuit includes an accelerometer, and the motion sensing circuit emits a firearm motion signal representative of movement of the firearm body.

A further aspect of the present invention provides a method of providing firearm user input information to a user. The method includes the steps of: (a) providing a firearm body including a firearm trigger and a position input circuit including a multi-axis position controller, the firearm trigger being attached to the multi-axis position controller; (b) pulling the trigger; (c) sensing movement of the trigger along at least two axes; (d) communicating trigger position information to an electronic device having a monitor; and (e) displaying on the monitor of the electronic device a graphical trigger position indicator representative of the actual trigger pull path taken by the trigger during the trigger pull.

One object of the present invention is to provide a trigger pull training system that allows a user to monitor user input, including the actual trigger pull path, during or after a trigger pull.

Another object of the present invention is to provide a trigger pull training system that allows a user to monitor actual barrel displacement associated with a trigger pull.

Another object of the present invention is to provide a trigger pull training system that allows a user to simultaneously monitor both actual trigger pull path and corresponding barrel displacement.

Yet another object of the present invention is to provide a system that allows a user to record information associated with multiple trigger pulls and then display that information sequentially or simultaneously on a display screen of an electronic device.

Yet another object of the present invention is to provide a system that wirelessly transmits information associated with a trigger pull to an electronic device for storage and/or display.

Yet another object of the present invention is to provide a method of training a shooter to improve trigger pull technique by allowing the user to graphically monitor the actual trigger pull path on a screen of an electronic device.

A further object of the present invention is to provide a method of measuring trigger movement along at least two dimensions by recording the longitudinal and lateral coordinates of a trigger at multiple points during a trigger pull.

Numerous other objects, features and advantages of the present invention will be readily apparent to those of skill in the art, upon a reading of the following disclosure, when taken in conjunction with the accompanying drawings.

BRIEF DESCRIPTION OF THE DRAWINGS

FIG. 14A illustrates an embodiment of a firearm system including a firearm apparatus in wireless communication with a mobile electronic device such as a cellular telephone.

FIG. 14B illustrates an embodiment of a mobile electronic device for use in a firearm system of the present invention.

FIG. 15 illustrates an embodiment of a firearm body in accordance with the present disclosure showing a computer readable storage medium.

DETAILED DESCRIPTION

Figure 1:
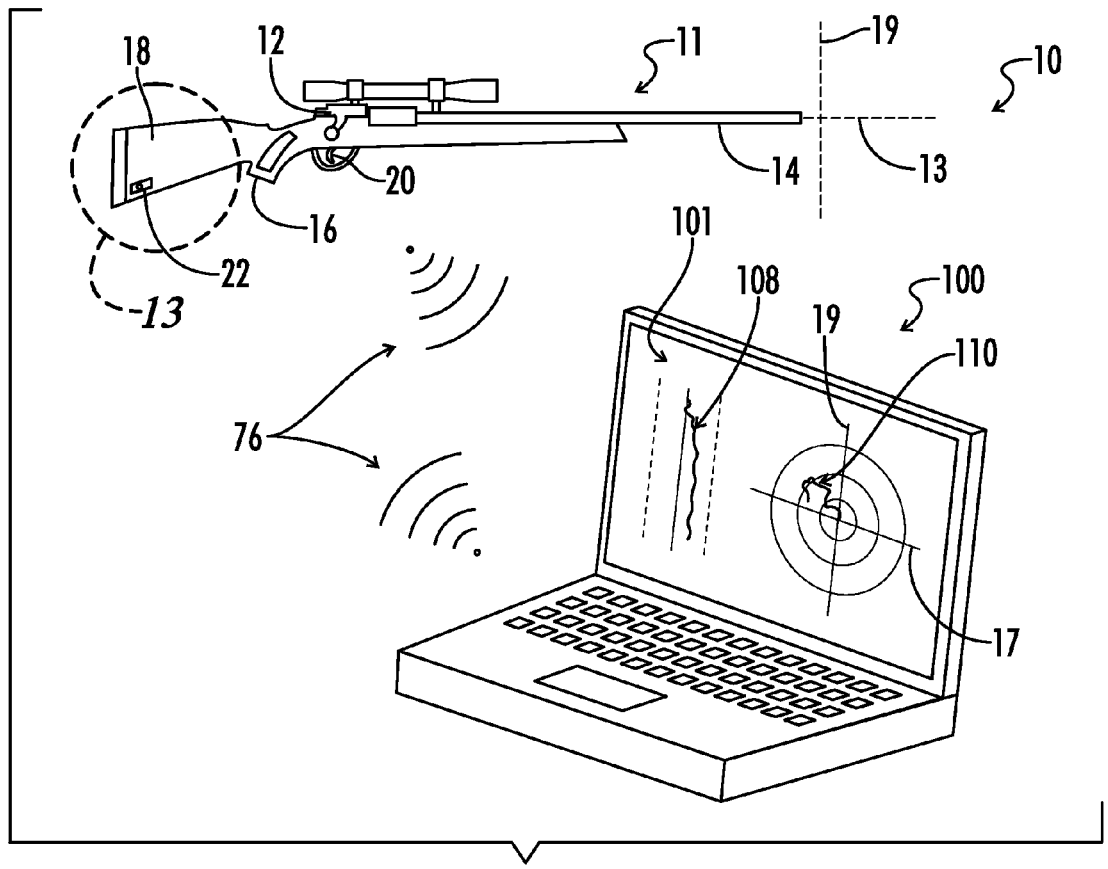
FIG. 1 illustrates a perspective view of an embodiment of a firearm system including a firearm body in the form of a rifle and an electronic device in wireless communication with the firearm body.

Referring now to the drawings, FIG. 1 illustrates a perspective view of an embodiment of a firearm system generally designated by the numeral 10. In the drawings, not all reference numbers are included in each drawing for the sake of clarity. In addition, positional terms such as "upper," "lower," "side," "top," "bottom," etc. refer to the apparatus when in the orientation shown in the drawing. The skilled artisan will recognize that the apparatus can assume different orientations when in use.

The firearm system 10 of the present invention generally provides a user the ability to graphically monitor user input to the firearm during or after a live or simulated trigger pull. A trigger pull generally includes the act of depressing, or pulling, the trigger using one or more fingers of the firearm user's hand. In some embodiments, the firearm system 10 allows a firearm user to monitor both the lateral and the longitudinal displacement of the firearm trigger 20 during or after a trigger pull. Such information is important to a firearm user for training purposes or for shot analysis. When a firearm trigger is pulled directly back only along a longitudinal axis, a fired shot actuated by that trigger pull is more likely to be on target. However, when a trigger pull includes a lateral displacement component, the firearm barrel can move inadvertently during the trigger pull, thereby causing the shot to move off the desired target. By measuring and monitoring the path of the trigger in at least two dimensions, a firearm user can improve the trigger pull technique to improve accuracy.

Additionally, in some applications, a firearm user can use firearm system 10 of the present invention to measure and graphically monitor barrel displacement associated with a trigger pull. For example, a trigger pull that includes trigger movement in more than one direction, i.e. a trigger pull having at least a two dimensional trigger pull path, can cause the firearm barrel to inadvertently move during the trigger pull. The term "trigger pull path" as used herein refers to the actual two-dimensional movement experienced by a trigger during a trigger pull from an initial resting position to a firing position. Such movement can be detected and graphically monitored by the user of firearm system 10 in some embodiments.

Thus, firearm system 10 of the present invention can be used to monitor the path of a trigger only, to monitor barrel displacement only, or to monitor both the path of a trigger and the displacement of the barrel. In some applications, firearm system 10 can be used as a training tool during dry firing of a firearm or a firearm replica to train a user to improve trigger pull technique. In other applications, the firearm system 10 of the present invention can be used to measure and store data associated with a trigger pull path and/or associated barrel displacement data during live firing such as firing during target practice, product testing, hunting, recreational or competitive shooting, and combat.

Referring further to FIG. 1, an embodiment of a firearm system 10 includes a firearm body 11. Firearm body 11 in some embodiments includes a firearm such as a pistol, a rifle or a shotgun. In other embodiments, the firearm body 11 can include a replica of a pistol, rifle, shotgun or other type of firearm known in the art. In FIG. 1, one embodiment of a firearm body 11 including a rifle is generally illustrated. Firearm body 11 generally includes a handle 16 and a barrel 14 extending from the handle 16. Barrel 14 defines a longitudinal barrel axis 13 substantially aligned with the bore of barrel 14. Barrel 14 includes a hollow bore in some embodiments and is adapted for ejecting one or more projectiles. A firearm trigger 20 is positioned on firearm body 11. Firearm trigger 20 can be configured for engagement by a single finger of a user's hand when the user's hand is positioned on handle 16. In the embodiment illustrated in FIG. 1, firearm body 11 also includes a shoulder stock 18.

As seen in FIG. 1, an electronic device 100 is in communication with firearm body 11 in some embodiments. Electronic device 100 can include any type of electronic device known in the art for graphically displaying information or for storing information. Electronic device 100 in some embodiments includes a portable electronic device such as a laptop notebook computer or a tablet computer such as an Apple iPad or a Blackberry Playbook. In some embodiments, electronic device 100 can be a desktop computer or other fixed electronic device. In further embodiments, electronic device 100 can be a mobile cellular handset, i.e. a cellular telephone such as an iPhone manufactured by Apple Inc. of Cupertino, Calif. or various other models of cellular telephones manufactured by various other manufacturers including Samsung, Research in Motion, Nokia, etc. In additional embodiments, electronic device 100 can include a personal data assistant (PDA) or a television. In further embodiments, electronic device 100 can include a television.

Electronic device 100 typically includes a screen 101. The screen 101 can be a backlit screen such as a television or computer screen, an LED or LCD screen, or other types of display screens known in the art. As seen in FIG. 1, electronic device 100 can communicate with firearm body 11 using a wireless communication signal 76 in some embodiments. In other embodiments, electronic device 100 can communicate with firearm body 11 using a wired connection.

Figure 2:
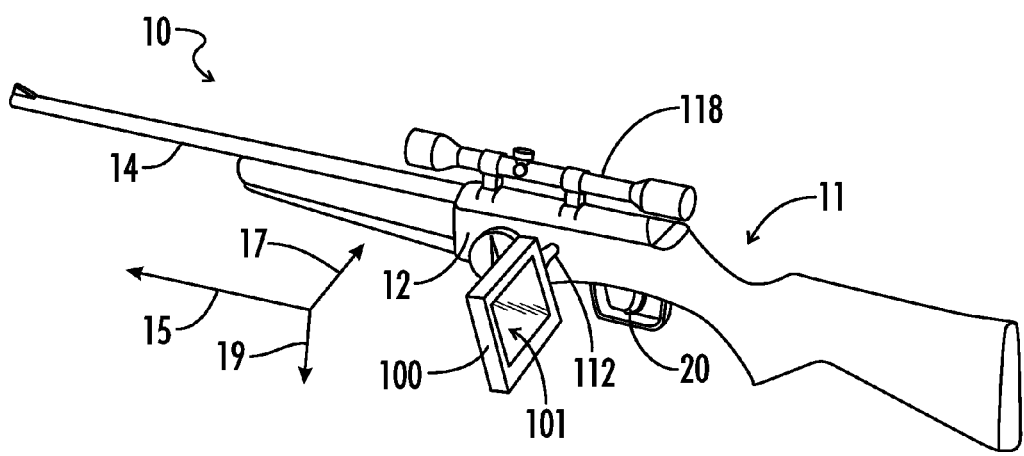
FIG. 2 illustrates a perspective view of one embodiment of a firearm system including a firearm body and an electronic device having a display screen attached to the firearm body.

Referring now to FIG. 2, in some embodiments, electronic device 100 is attached to firearm body 11. Electronic device 100 includes a screen 101 generally facing away from the barrel 14 positioned for viewing by a user of the firearm system. Electronic device 100 is pivotally attached to firearm body 11 at a pivoting joint 112. Electronic device 100 can be rotated, or pivoted, about pivoting joint 112 for adjusting the angular position of electronic device 100 relative to firearm body 11. Pivoting joint 112 allows electronic device to be repositioned for ease of viewing or for storage when not in use. Electronic device 100 is illustrated in FIG. 2 generally in an open position for viewing by the user of the firearm system 10. One or more wires can extend between electronic device 100 and firearm body 11 in this embodiment.

In some embodiments, a scope 118 is attached to firearm body 11, as seen in FIG. 2. Scope 118 can include a viewing port and a screen generally adapted to display trigger pull information. Scope 118 in some embodiments includes one or more lenses transparent to visible wavelengths of light. An operator of firearm body 11 can look through scope 118 toward a desired or simulated target. In some embodiments, scope 118 includes an internal graphical display screen adapted to display user input information. By observing the graphical display screen housed in scope 118, a user can maintain visual contact with a target and monitor trigger pull path through the scope lens during a trigger pull.

Referring further to FIG. 2, three coordinate axes are generally defined relative to firearm body 11. First axis 15 generally defines a longitudinal axis along which the trigger is primarily pulled during a trigger pull. First axis 15 can be oriented parallel to the barrel 14 and the longitudinal barrel axis 13 in some embodiments, and can be described as a longitudinal axis or a primary axis. A second axis 17 is generally oriented perpendicular to the first axis 15. Second axis 17 can be described as a lateral axis 17 in some embodiments and is generally horizontal when the firearm body 11 is held in an upright position. A third axis 19 is generally oriented perpendicular to both first axis 15 and second axis 17. Third axis 19 can be described as a vertical axis in some embodiments.

Figure 16:
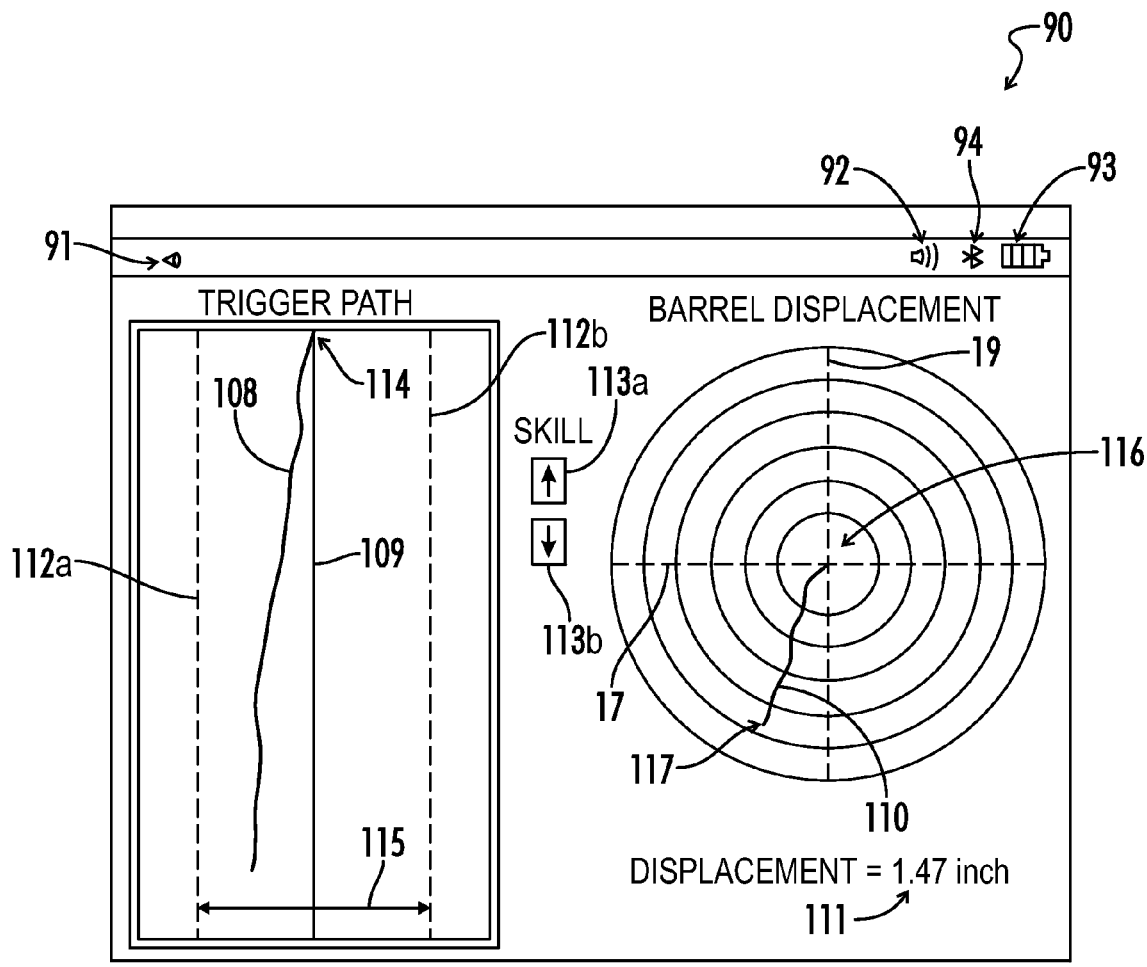
FIG. 16 illustrates an embodiment of a graphical user interface for display on an electronic device in accordance with the present invention.

Referring again to FIG. 1 and to FIG. 16, one or more graphical indicators can be displayed on electronic device 100 to graphically communicate, or display, firearm user input. At least two types of firearm user input can be graphically displayed on electronic device 100. First, as seen in FIG. 16, electronic device 100 can provide a graphical display, or a graphical user interface 90, showing a line representative of the trigger movement during a trigger pull, also referred to as a trigger position indicator 108. Trigger position indicator 108 generally includes a line representative of the trigger pull path, or trigger movement, along at least two axes. Graphical user interface 90 can include a Cartesian coordinate plate representative of the two axes the trigger can be moved along during a trigger pull. For example, trigger 20 can be pulled along first axis 15 and second axis 17 during a trigger pull. The trigger position indicator 108 includes a line that extends along first axis 15 and along second axis 17 on the Cartesian coordinate system. The trigger position indicator 108 includes a plurality of individual points connected by a line, wherein each point includes an X coordinate and a Y coordinate corresponding to a position of the trigger at an instant in time. Trigger position indicator 108 can be displayed graphically to scale on screen 101. For example, a trigger movement of one micron can be graphically displayed as a one millimeter or larger line on screen 101. A trigger position scale ratio of actual trigger movement to trigger position indicator length as displayed on screen 101 of between about 1:1 and about 1:1000 is used in some embodiments of firearm system 10.

As seen in FIG. 16, graphical user interface 90 can be displayed on screen 101 of electronic device 100. Graphical user interface 90 displays a trigger position indicator 108 represented as a line. In some embodiments, trigger position indicator 108 includes a single line beginning at a zero position 114 and moving away from the zero position 114. Trigger position indicator 108 moves relative to a center line 109 so that a user can visually detect any lateral movement of the trigger. Center line 109 represents the longitudinal axis 15 in some embodiments. In some embodiments, center line 109 and trigger position indicator 108 can be of different colors.

Also seen in FIG. 16, one or more boundary lines 112a, 112b are displayed on graphical user interface 90 in some embodiments. Boundary lines 112a, 112b represent an acceptable range of lateral trigger movement. When trigger position indicator 108 is entirely within boundary lines 112a, 112b, a successful trigger pull can be indicated by firearm system 10 by a first audio or visual indicator, such as a light or a beep. However, if the trigger position indicator 108 extends outside first or second boundary lines 112a, 112b, an unsuccessful trigger pull can be indicated by firearm system 10 by a second audio or visual indicator, wherein the first and second audio or visual indicators are different. First and second boundary lines 112a, 112b can be adjusted by the user to represent different trigger pull skill levels. Each skill level can correspond to a change in a sensitivity setting in some embodiments. For example, when distance 115 between boundary lines is decreased, the difficulty of performing a successful trigger pull is increased. Multiple virtual skill levels can be programmed by a user using electronic device 100 or using firearm body 11 for providing skill levels of varying difficulty. In one embodiment, a virtual skill level control having a first skill level control 113a and a second skill level control 113b is included on graphical user interface 90. First skill level control 113a includes a virtual control for increasing skill level, i.e. for moving boundary lines 112a, 112b closer together. Similarly, second skill level control 113b includes a virtual control for decreasing skill level, i.e. for moving boundary lines 112a, 112b farther apart.

Electronic device 100 can, in some embodiments, display the trigger position indicator 108 in real time during the trigger pull. For example, the firearm system 10 can be in communication with electronic device 100 during the trigger pull so that a communication signal including trigger position information is communicated to electronic device 100 during the trigger pull. The communication signal generally includes the longitudinal and lateral position coordinates of the trigger and/or scaled data associated with the longitudinal and lateral position coordinates along the first and second axes, respectively. Alternately, the communication signal can include information that can be used to calculate the longitudinal and lateral position coordinates of the trigger. In one embodiment, a communication signal is transmitted to the electronic device 100 by a wired connection using a cable 23, as seen in FIG. 4. Cable 23 can include a universal serial bus (USB) cable in some embodiments. In other embodiments, the communication signal is transmitted to the electronic device using a wireless connection, as illustrated in FIG. 1 and FIG. 3 for example. In other embodiments trigger position indicator 108 is displayed in semi-real time following one or more update delays in the communication signal transmitted between firearm body 11 and electronic device 100. For example, communication signal may be transmitted in periodic bursts, creating a short lag between the movement of the trigger 20 and the graphical display of trigger position indicator 108 on electronic device 100. In additional embodiments, trigger position indicator 108 is not displayed at all during the trigger pull, but is rather displayed on the display screen 101 at a user's command after the trigger pull has been completed.

As noted above, the trigger pull path can influence the position of the firearm barrel 14 relative to a target. When the trigger pull path includes a lateral component, the firearm body 11 can move up or down and/or from side to side, thereby moving firearm barrel 14 and influencing the trajectory of the bullet or projectiles at the moment an actual or simulated shot is fired. The motion of the barrel 14 is generally measured relative at least two axes. First, the barrel can move along the lateral axis discussed above. Second, the barrel can move generally up and down along a vertical axis 19, seen in FIG. 1. The movement of barrel 14 relative to the lateral and vertical axes can influence the shot trajectory. Thus, it is important for a firearm user to monitor the barrel displacement path during the trigger pull. By monitoring the effect a trigger pull has on the barrel displacement, a user of the firearm system 10 of the present invention can train to improve trigger pull technique for minimizing inadvertent barrel displacement.

As seen further in FIG. 1 and FIG. 16, in some embodiments a barrel displacement indicator 110 can also be displayed on graphical user interface 90 on screen 101 of electronic device 100. Barrel displacement indicator 110 graphically indicates movement of the firearm body 11, and particularly movement of barrel 14, experienced during the trigger pull. For example, a trigger pull that includes a lateral trigger movement can cause a corresponding movement of the firearm body 11. Barrel displacement indicator 110 provides a graphical representation of the direction and the magnitude of the movement of firearm body 11. Barrel displacement indicator 110 can be illustrated as a line beginning at a barrel zero position 116 and extending outward along at least two axes 17, 19. Barrel displacement indicator 110 indicates lateral movement along second axis 17 and vertical movement along third axis 19. The movement of firearm body 11, and particularly barrel 14, represented by barrel displacement indicator 110 can be due to linear motion along one or more axes, angular rotation about one or more axes, or a superposition of both linear motion and angular rotation about one or more axes. By monitoring the barrel displacement during the trigger pull, a user can detect the amount of inadvertent barrel movement that results from a pull of the trigger.

Also seen in FIG. 16, a numeric barrel displacement indicator 111 can be included on graphical user interface 90. Numeric indicator 111 indicates the distance the barrel has moved off the barrel zero position 116 during the trigger pull. Generally, the barrel position indicator 110 begins at the origin, or barrel zero position 116, when a trigger pull is initiated. Movement of the firearm body 11 is measured throughout the trigger pull, and the movement is graphically displayed as a line forming barrel displacement indicator 110. When the trigger pull is complete, the barrel displacement indicator 110 stops at a final barrel displacement position 117. Numeric indicator 111 indicates the distance between the final barrel displacement position 117 and the barrel zero position 116. Numeric indicator 111 can be programmed to display the numeric distance a projectile fired from the firearm body 11 will move off the zero barrel position 116 following a trigger pull. Numeric barrel displacement indicator 111 in some embodiments can indicate barrel displacement data scaled to correspond to various shot parameters, including target distance.

Figure 3A:
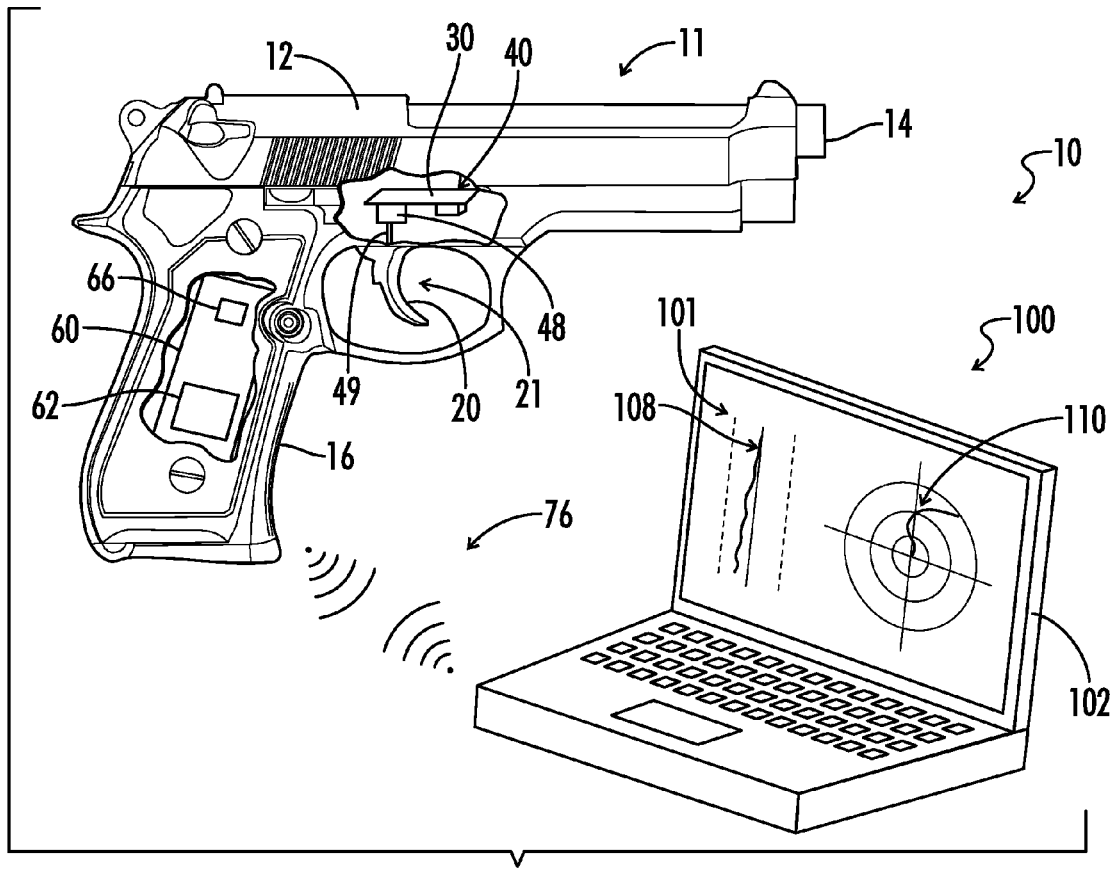
FIG. 3A illustrates a perspective view of an embodiment of a firearm system including a firearm body in the form of a handgun and an electronic device in wireless communication with the firearm body.
Figure 4:
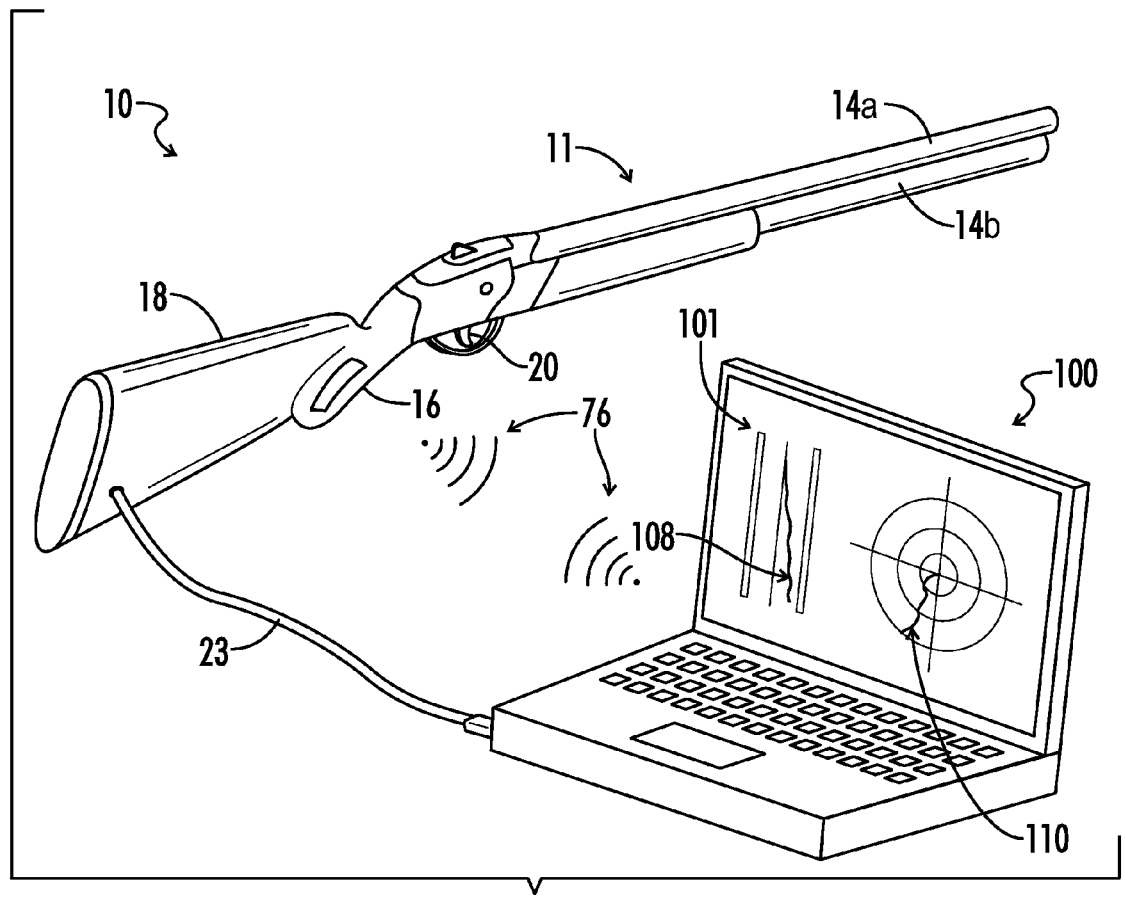
FIG. 4 illustrates a perspective view of an embodiment of a firearm system including a firearm body in the form of a shotgun and an electronic device in communication with the firearm body.

Referring now to FIG. 3A, in some embodiments, firearm apparatus 10 includes a firearm body 11 having the shape of a pistol, or a handgun. Firearm body 11 can include a semiautomatic handgun, a revolver, or another type of handgun or handgun replica known in the art. Firearm body 11 in this embodiment generally includes a handle 16 adapted for being gripped by a user's hand. A trigger 20 is attached to firearm body 11 generally extending toward handle 16. In some embodiments, the trigger 20 is shaped for being engaged by only one finger of a user's hand when the user's hand is positioned on handle 16. Trigger 20 generally includes a curved, or concave, region 21. A first circuit board 30 is disposed inside receiver 12 on firearm body 11. First circuit board 30 generally includes a position input circuit including a multi-axis position controller 48. In some embodiments, more than one single-axis position controllers can be used in the position input circuit instead of a single multi-axis position controller 48. Position controller 48 includes a post 49 extending downward away from the first circuit board 30. Trigger 20 is mechanically attached to post 49 so that when trigger 20 is pulled toward the back of the trigger guard 16, post 49 is moved toward handle 16 and an electronic trigger position signal is generated by position controller 48. As seen in FIG. 3A, a firearm body 11 having a handgun shape is in communication with electronic device 100 via a wireless communication signal 76 in some embodiments. Trigger position indicator 108 can be graphically displayed on electronic device 100 and corresponds to the movement of trigger 20 during the trigger pull. A barrel displacement indicator 110 is also displayed on electronic device 100 and corresponds to the displacement of barrel 14 during the trigger pull.

Figure 3B:
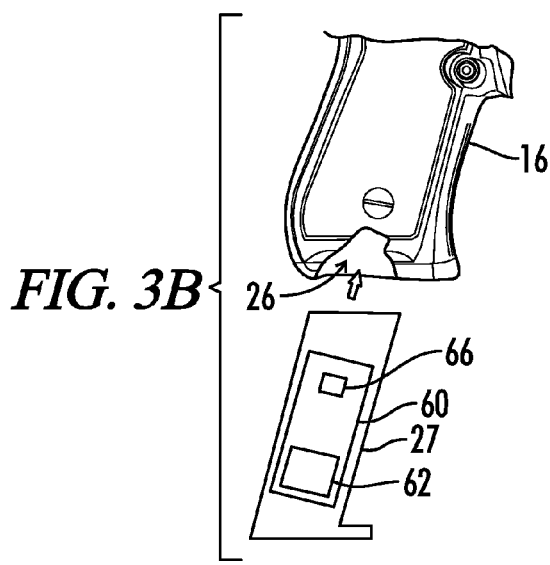
FIG. 3B illustrates a partially broken away exploded view of an embodiment of a handle of a firearm body.

As seen in FIG. 3B, in some embodiments, handle 16 defines a handle cavity 26. A handle insert 27 can be inserted into handle cavity 26. In some embodiments, a second circuit board 60 is positioned on insert 27. Handle insert 27 can be inserted into handle 16 on firearm body 11 in some embodiments. In some embodiments, removable insert 27 is interchangeable with an ammunition magazine, or clip, for insertion into handgun cavity 26. In some embodiments, handle insert 27 includes a magazine for storing ammunition and a second circuit board 60.

Referring now to FIG. 4, in some embodiments, firearm system 10 includes a firearm body 11 forming a shotgun or a replica of a shotgun. Firearm body 11 generally includes a barrel 14 and a handle 16. Barrel 14 in some embodiments can include a first barrel 14a and a second barrel 14b. A shoulder stock, or butt stock 18, is also attached to firearm body 11. In some embodiments, the firearm body 11 can include an over-and-under shotgun, a side-by-side shotgun, a single shot shotgun, a pump shotgun or a semi-automatic shotgun. The shotgun of FIG. 4 can communicate with an electronic device 100 by a communication signal 76. In some embodiments, communication signal is a bidirectional wireless data signal. In other embodiments, a communication wire 23 can be connected to firearm body 11 at a first end and also connected to electronic device 100 at a second end for providing a path for transmission of communication signal 76.

Figure 5:
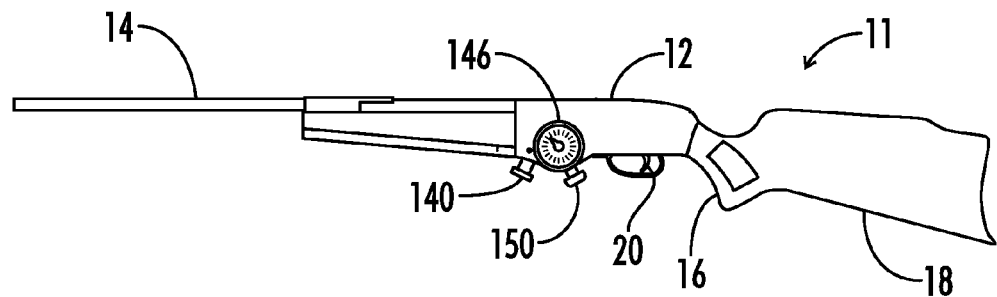
FIG. 5 illustrates a side elevation view of an embodiment of a firearm body.

Referring now to FIG. 5, in some embodiments a firearm body 11 includes an adjustable trigger 20. Trigger 20 in one embodiment includes a mechanism for adjusting the trigger pull force, or the amount of force required to fully depress trigger 20. In different applications, different types of firearms can include triggers having different trigger pull force characteristics. For example, a long-range hunting rifle may have a trigger that requires a relatively small amount of longitudinal force to actuate the trigger and to fire a round. In contrast, a shotgun or handgun for use in some applications can include a trigger that has a relatively larger trigger pull force requirement. Additionally, different firearm operators may prefer different trigger pull force settings. In some embodiments, the present invention provides a firearm body 11 that includes an adjustable trigger pull force. In some embodiments, seen in FIG. 5 and FIG. 6, a tensioner knob 140 extends from receiver 12. Tensioner knob 140 can be rotated to adjust the tension applied to trigger 20. A trigger tension indicator 146 is also disposed on firearm body 11. Trigger tension indicator 146 generally indicates the current tension setting of trigger 20 on firearm body 11. When the tensioner knob 24 is turned in a first direction, the trigger tension can be reduced, and when the tensioner knob 24 is turned in the opposite direct, the trigger tension can be increased.

Figure 7:
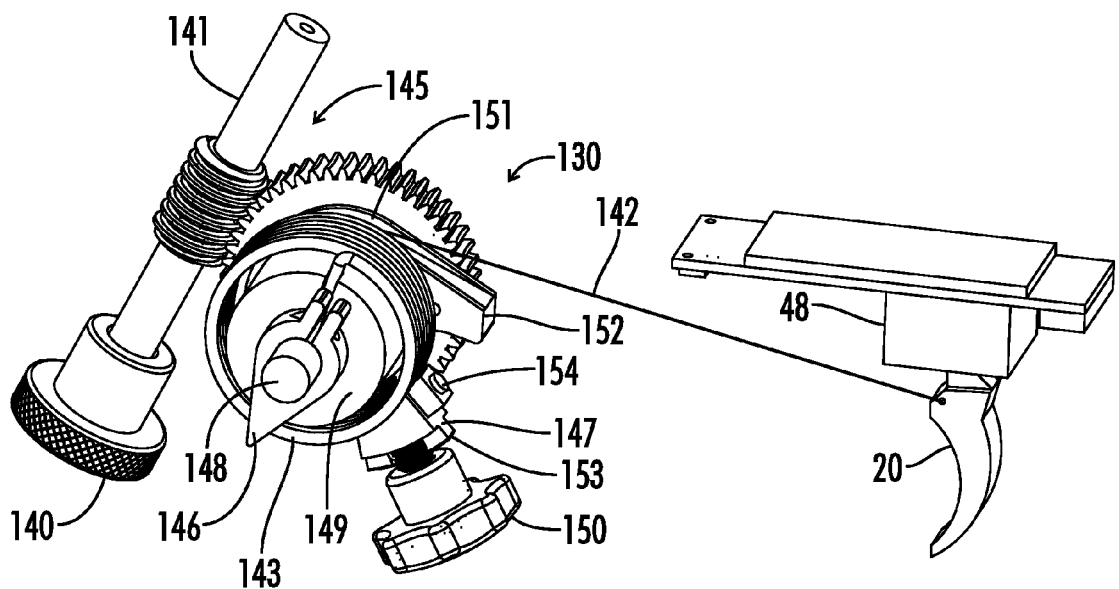
FIG. 7 illustrates a partially broken away detail view of an embodiment of a firearm body showing a trigger tensioner assembly.

Referring now to FIG. 7, a trigger tensioner assembly 130 is disposed on firearm body 11 in some embodiments. Trigger tensioner assembly 130 includes a shaft 148 and a means for rotating the shaft. In some embodiments, the means for rotating the shaft is a worm gear 145. The worm gear 145 includes worm gear shaft 141 with a worm drive that can be rotated using a tensioner knob 140. When worm gear shaft 141 is rotated, the worm drive engages worm gear 145 and causes shaft 148 to rotate. A spring mandrel 149 is attached to shaft 148. In some embodiments, spring mandrel 149 is attached to worm gear 145. Spring mandrel 149 includes a torsion spring 143 disposed around spring mandrel 149. Torsion spring 143 can include one or more turns of a resilient wire-shaped material around the spring mandrel 149. In some embodiments, a first end of torsion spring 143 is rigidly attached, or fixed, to the spring mandrel 149. The second end of torsion spring 143 can be attached to a pulley 151 rotatably disposed about spring mandrel 149. In some embodiments, pulley 151 is pivotally attached to shaft 148. Pulley 151 can generally rotate relative to shaft 148 and/or spring mandrel 149. When pulley 151 is attached to spring 143, pulley 151 is biased toward a first angular position such that when pulley 151 is forcibly rotated to a second angular position, the torsion spring 143 acts to apply a force on pulley 151 directed toward the first angular position.

Figure 8:
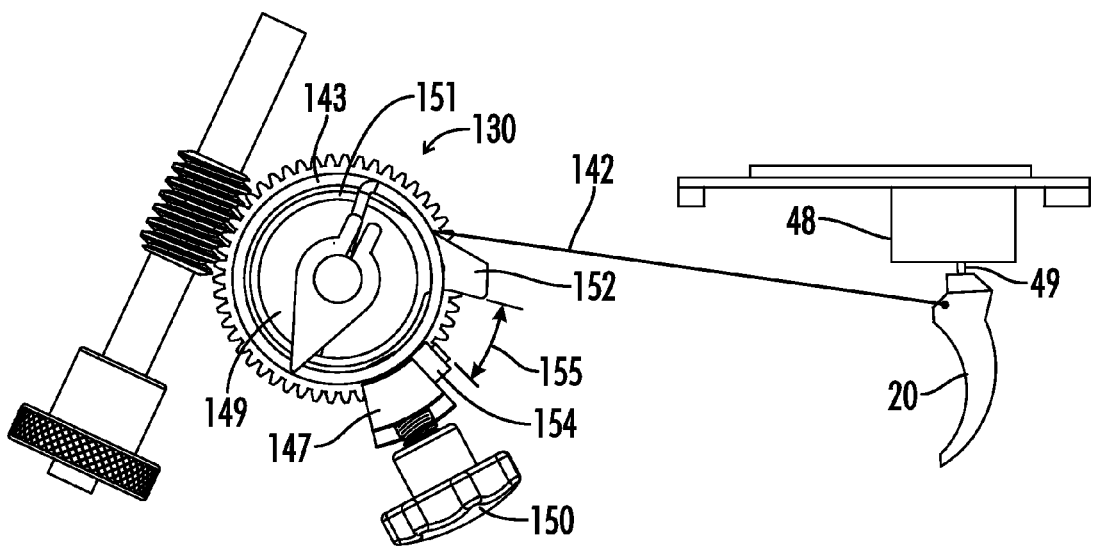
FIG. 8 illustrates a partially broken away detail view of an embodiment of a firearm body showing a trigger tensioner assembly.

The tensioner assembly 130 includes a tensioner cable 142, as seen in FIG. 7 and FIG. 8. Tensioner cable 142 can include a pliable cable comprising a metal or plastic material or any other material suitable for withstanding and transferring tensile forces known in the art. In some embodiments, tensioner cable 142 can include a rigid or semi-rigid member extending wholly or partially between trigger 20 or post 49 and pulley 151. As seen in FIG. 7, cable 142 extends from trigger 20 to pulley 151. In some embodiments, when trigger 20 is at a resting, or zero position, a tension preload is applied to pulley 151 by spring 143, causing cable 142 to remain under a tensile load when trigger 20 is at a resting position, i.e. not actuated. In other embodiments, when trigger 20 is at a resting, or zero position, no tension preload is applied to pulley 151 by spring 143. When tensioner knob 140 is rotated, the tension applied to cable 142 is increased or decreased in a controlled manner by changing the tension in spring 143.

Referring further to FIG. 7 and FIG. 8, pulley 151 can include a pulley flange 152 protruding from pulley 151. Pulley flange 152 can extend toward trigger 20 in some embodiments. In other embodiments, pulley flange 152 extends from any other angular position on pulley 151. When trigger 20 is pulled generally away from tensioner assembly 130, pulley 151 rotates about spring mandrel 149 and/or shaft 148. As pulley 151 rotates during the trigger pull, an angular force acts on pulley 151 provided by spring 143 generally opposing the direction of pulley rotation. During pulley rotation, pulley flange 152 also rotates.

Figure 6:
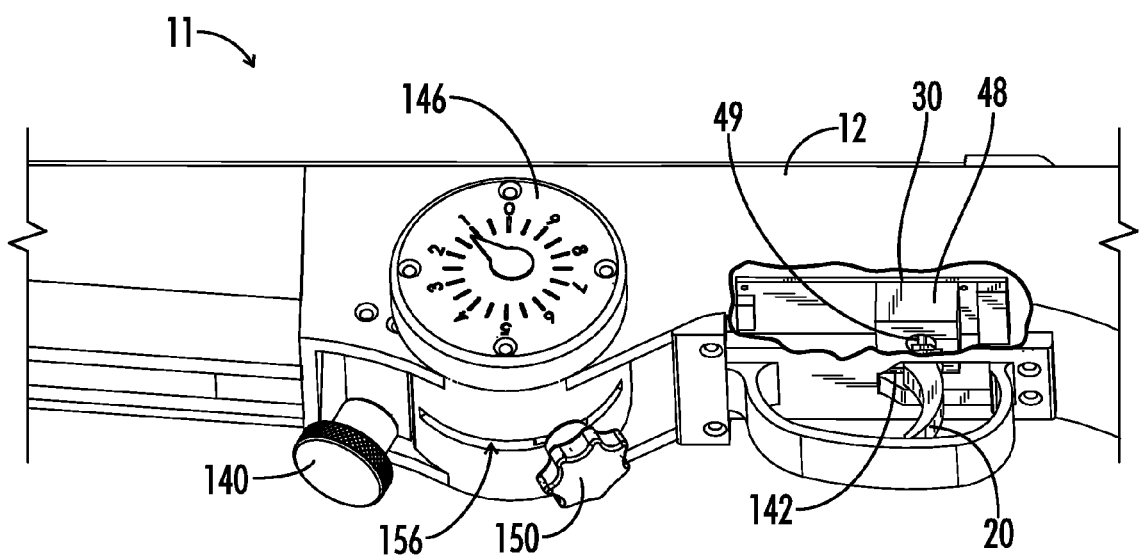
FIG. 6 illustrates a bottom perspective view of an embodiment of a firearm body.

As seen in FIG. 5 and FIG. 6, a creep adjustment knob 150 extends from firearm body 11 in some embodiments. Creep adjustment knob 150 can be selectively moved to adjust the trigger creep. Trigger creep is defined as the longitudinal distance the trigger is pulled before a firing mechanism is actuated inside firearm body 11 for firing a shot. When the trigger is pulled a predetermined distance, an event is initiated. The event can include the firing of a shot, or the beginning or end of data acquisition. By allowing adjustable trigger creep, firearm body 11 of firearm system 10 can provide a user the ability to simulate different types of firearms having various trigger creep characteristics for use in various shooting situations. Creep adjustment knob 150 in one embodiment, seen in FIG. 8, is attached to a trigger stop, or creep adjustment block 147. Trigger stop 147 can generally be angularly or radially positioned relative to tensioner assembly 130. In some embodiments, trigger stop 147 is attached to tensioner assembly 130. In other embodiments, trigger stop 147 is attached to firearm body and is generally moveable along creep slot 156, seen in FIG. 6, to adjust the amount of trigger creep. For example, when creep adjustment knob 150 is loosened, trigger stop 147 can be angularly repositioned along creep slot 156, thereby changing the trigger creep setting. Creep adjustment knob 150 can be tightened at the desired trigger creep setting, fixing trigger stop 147 in place by pulling trigger stop 147 toward creep adjustment knob 150. In some embodiments, a trigger stop flange 153 extends from trigger stop 147 and slidably engages creep slot 156.

Referring further to FIG. 8, in some embodiments trigger pull length, or trigger creep, is determined by the free angular rotation distance 155 between pulley flange 152 and trigger stop 147. As trigger 20 is pulled, pulley 151 and pulley flange 152 rotate toward trigger stop 147. Eventually, pulley flange 152 engages trigger stop 147 and the end of the trigger pull is reached, i.e. the trigger can be pulled no farther along the longitudinal axis. In some embodiments, a stop switch 154 is positioned on trigger stop 147. Stop switch 154 can include an electronic push-button or plunger style switch suitable for sending a signal to the electronics on firearm body 11 to indicate the end of the trigger pull has been reached. In other embodiments, stop switch 154 can include an optical switch such as a laser, a photodetector, or any other type of optical switch suitable for generating an output signal. When stop switch 154 is actuated, the electronics on firearm body 11 can generally perform a predetermined task. For example, in some embodiments, firearm body 11 can be used in a first mode wherein the trigger pull path indicator and/or barrel displacement indicators will not be displayed until the stop switch 154 is actuated. Similarly, in some embodiments, the information associated with a trigger pull will not be stored until the stop switch 154 is actuated. In additional embodiments, pulley flange 152, or another structure attached to tensioner assembly 130, will engage a mechanical firing mechanism on firearm body 11 for firing a shot.

Firearm body 11 generally includes a position input circuit including at least one position sensor, or position controller, operative for sensing movement of trigger 20 during a trigger pull along one or more axes. Typically, a trigger pull includes at least two position coordinates. First, trigger 20 is pulled along a first, or primary, axis. In some embodiments, the first axis 15 is parallel to longitudinal barrel axis 13. It is understood that in some embodiments the first axis 15 may be misaligned with the longitudinal barrel axis 13, and the primary longitudinal trigger pull direction is not aligned with the longitudinal barrel axis 13. Second, trigger 20 may be inadvertently moved laterally along a second axis 17 oriented substantially perpendicular to the first axis 15 during a trigger pull. The longitudinal and lateral trigger movement along at least the first and second axes form a trigger pull path.

Referring again to FIG. 3A, in some embodiments a firearm body 11 includes a position input circuit 40 including a multi-axis position controller 48 mechanically attached to trigger 20. In some embodiments, the multi-axis position controller is a dual-axis joystick controller. Multi-axis position controller 48 in an exemplary embodiment is a two-axis ministick controller model 252A103B60NA-ND manufactured by CTS Corporation of Elkhart, Ind. In some embodiments, position input circuit 40 is disposed on a first printed circuit board 30 positioned in receiver 12 generally above trigger 20. The multi-axis position controller 48 in some embodiments provides a post 49 protruding toward trigger 20, and trigger 20 is attached to post 49. Multi-axis position controller 48 in some embodiments includes one or more variable resistors that engage in sliding contact with one or more contact pads attached to post 49. When post 49 is moved along one or more axes, the resistance of the one or more variable resistors is changed. A corresponding voltage measured across each variable resistor will also change, and trigger movement can be determined by correlating a measured change in voltage to a change in position of post 49.

Figure 9A:
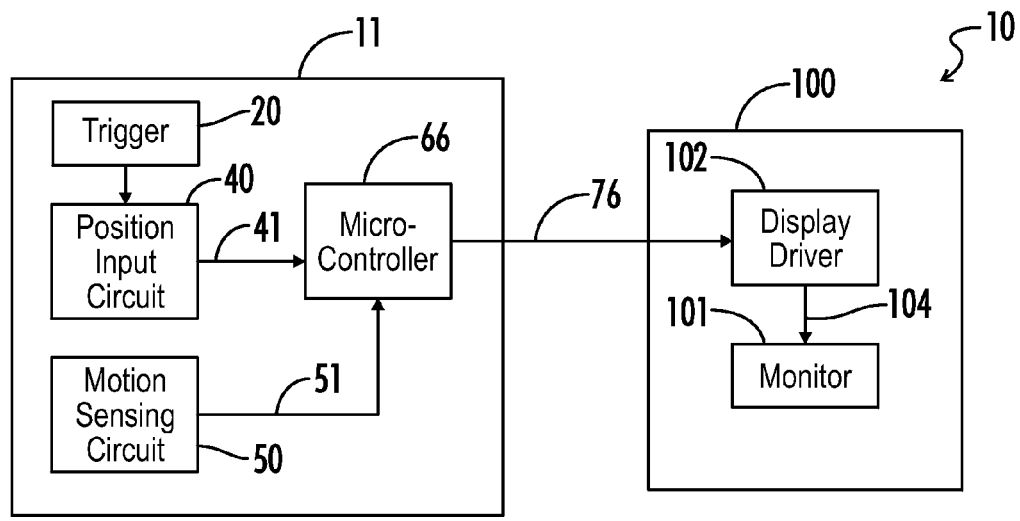
FIG. 9A illustrates an embodiment of a firearm system showing a wired communication signal path between a firearm body and an electronic device.

Referring now to FIG. 9A, in some embodiments position input circuit 40 is disposed on firearm body 11. Position input circuit 40 generally emits a trigger position signal 41 representative of the position of trigger 20. Trigger position signal 41 can include one or more analog voltage output signals or digital output signals. Trigger position signal 41 can be sent to a microprocessor, or microcontroller 66. In some embodiments, microcontroller 66 includes a programmable microcontroller, for example a model of the PIC24FJXXXGA1/GB1 family of microcontroller devices manufactured by Microchip Technology Inc. of Chandler, Ariz. In one embodiment, microcontroller 66 includes a model PIC24FJ256GA106-I/PT 16-bit microcontroller manufactured by Microchip Technology, Inc. of Chandler, Ariz. It is understood that other microcontroller devices produced by various manufacturers can also be used in accordance with the present invention.

Figure 10A:
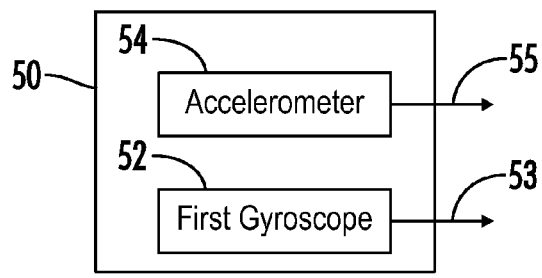
FIG. 10A illustrates an embodiment of a motion sensing circuit for use in a firearm body in accordance with the present invention.

Referring further to FIG. 9A, a motion sensing circuit 50 is also disposed on firearm body 11 in some embodiments. Motion sensing circuit 50 emits a firearm motion signal 51 representative of movement of firearm body 11. Firearm motion signal 51 is generally sent to microprocessor 66. Firearm motion signal 51 generally includes information related to the linear and/or rotational motion of firearm body 11 before, during or after the trigger pull, and can be conditioned using a signal conditioning circuit prior to being sent to microprocessor 66 in some embodiments. Firearm motion signal 51 can include an analog voltage signal or a digital signal. Motion sensing circuit 50 is generally configured for detecting and communicating motion of the firearm body 11 relative to a fixed reference frame such as a gravitational vector. In one embodiment, seen in FIG. 10A, motion sensing circuit 50 includes an accelerometer 54 and a first gyroscope 52. Accelerometer 54 generally emits an accelerometer signal 55 representative of linear motion of firearm body 11, and first gyroscope 52 generally emits a first rotational motion signal, or first gyroscope signal 53, representative of rotational motion of firearm body about at least one axis.

Accelerometer 54 is generally adapted to detect linear motion of firearm body 11 along at least one axis. For example, during a trigger pull, a user might inadvertently move, or jerk, the firearm body 11 along first axis 15, second axis 17 or third axis 19, thereby causing barrel 14 to move and affecting the trajectory of a fired shot. By measuring such linear movement of firearm body 11 along at least one axis, a user can monitor barrel movement. In some instances, such linear movement can be associated with an improper trigger pull. Accelerometer 54 can be a single-axis accelerometer adapted for detecting motion in only one linear direction, a dual-axis accelerometer adapted for detecting motion in two linear directions, or a three-axis accelerometer adapted for detecting motion in three linear directions. In one embodiment, accelerometer 54 includes a model LIS352AX MEM inertial sensor three-axis absolute analog-output accelerometer manufactured by STMicroelectronics of Geneva, Switzerland. Accelerometer 54 emits an accelerometer signal 55, or linear motion signal 55. Linear motion signal 55 includes a signal corresponding to linear movement of firearm body along at least one axis. In some embodiments, linear motion signal 55 can be sent to a signal conditioner 56, seen in FIG. 11, for improving the quality of the linear motion signal 55. For example, an operational amplifier circuit can be used as a signal conditioner 56 for conditioning linear motion signal 55, as seen in one embodiment in FIG. 11. A conditioned linear motion signal 58 can be emitted from the signal conditioner 56 to a microprocessor 66 in some embodiments. Conditioned linear motion signal 58 can be amplified or filtered to remove noise, and can generally include one or more analog voltage signals or digital signals.

Figure 10B:
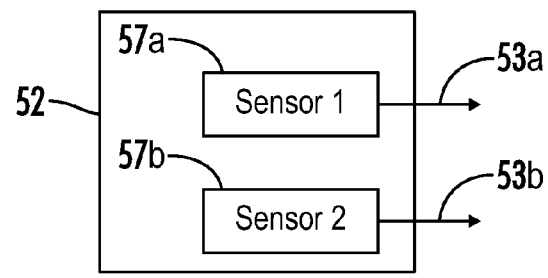
FIG. 10B illustrates an embodiment of a gyroscope for use in a motion sensing circuit of and embodiment of a firearm body in accordance with the present invention.

First gyroscope 52 is generally operable to detect rotational motion of firearm body 11 about at least one axis. For example, during a trigger pull, a user might inadvertently move, or jerk, the firearm body 11 in a rotational motion about one or more axes including first axis, 15, second axis 17 and/or third axis 19. Such rotational movement of firearm body 11 around any one or more axes can cause barrel 14 to move, thereby affecting the trajectory of a fired shot. In some embodiments, first gyroscope 52 can include a micro-electromechanical system (MEMS) sensor and can include more than one gyroscope sensor included in a single integrated circuit (IC) package. For example, in one embodiment, first gyroscope 52 includes a model IDG-1150 dual-axis gyroscope manufactured by InvenSense, Inc. of Sunnyvale, Calif. First gyroscope 54 includes two gyroscope sensors integrated on a single chip in some embodiments, as seen in FIG. 10B. In one embodiment, first sensor 57a is adapted to measure rotation of firearm body 11 about the first axis 15, and second sensor 57b is generally adapted to measure rotation about the second axis 17. First sensor 57a emits a first sensor signal 53a corresponding to rotation about the first axis 15, and second sensor 57b emits a second sensor signal 53b corresponding to rotation about the second axis 17. First and second sensor signals 53a, 53b form first gyroscope signal, or first rotational signal 53, which includes an analog voltage signal in some embodiments. In other embodiments, first rotational signal 53 includes a digital output signal.

Figure 11:
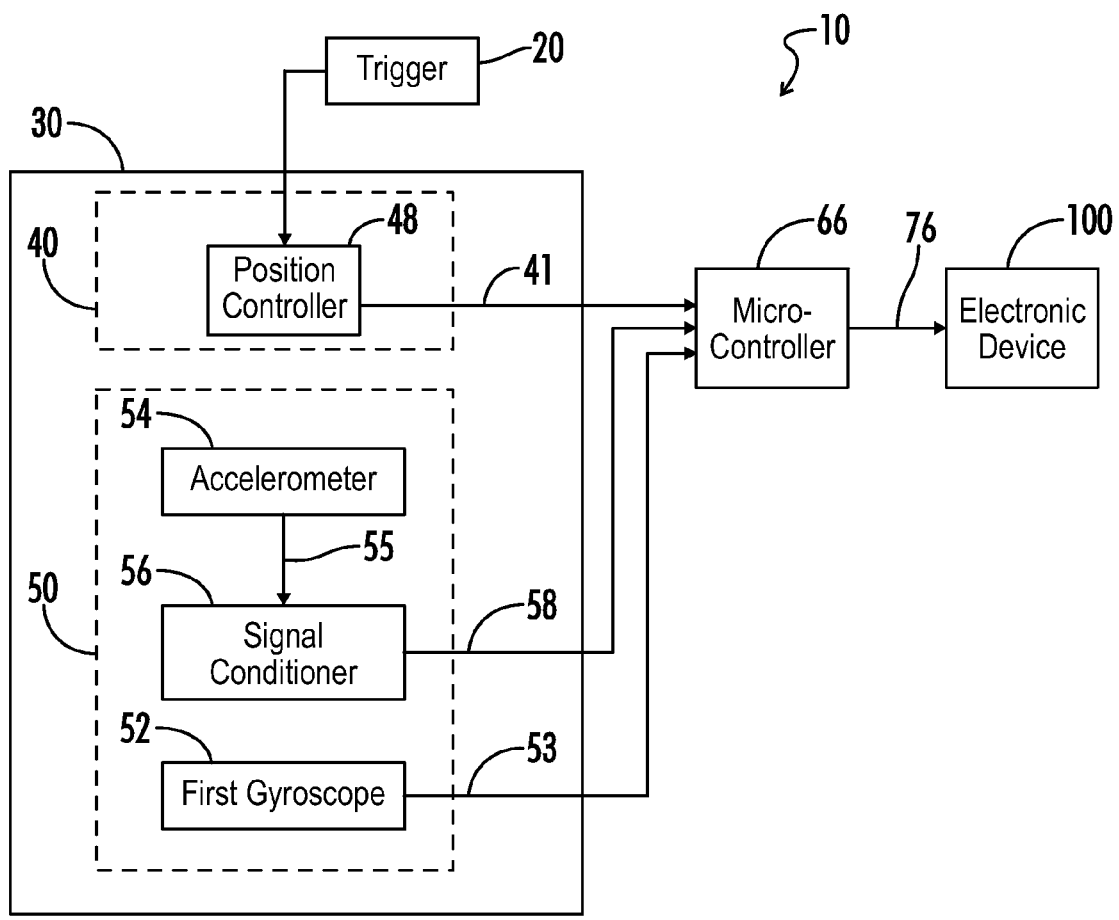
FIG. 11 illustrates an embodiment of a firearm system.
Figure 12:
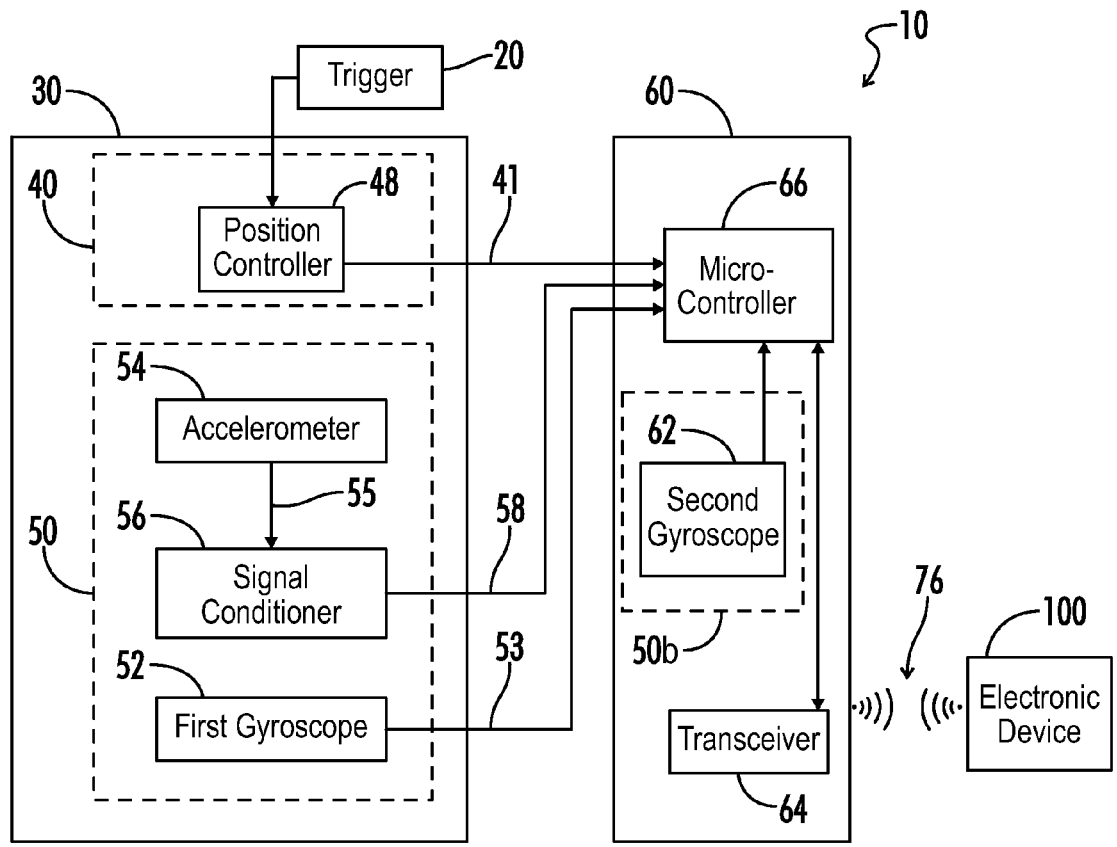
FIG. 12 illustrates an embodiment of a firearm system.

Referring to FIG. 11, in some embodiments, position input circuit 40 and motion sensing circuit 50 are both positioned on a first circuit board 30. In some embodiments, microcontroller 66 can also be positioned on first circuit board 30. In yet other embodiments, as seen in FIG. 12, microcontroller 66 is positioned on a second circuit board 60. Second circuit board 60 can be positioned on firearm body 11 at various locations, including on receiver 12, stock 18, as illustrated in one embodiment in FIG. 13, or handle 16 as illustrated in one embodiment in FIG. 3A. Additionally, second circuit board 60 can be detachably secured to firearm body 11 on a removable insert 27 adapted to be inserted into a hollow region 26 defined in handle 16, seen in FIG. 3B. Second circuit board 60 can include a second gyroscope 62 operable to detect rotation of the firearm body about a third axis 19 oriented substantially perpendicular to the longitudinal barrel axis 13. The third axis 19 can also be described as being perpendicular to the longitudinal barrel axis 13 when the third axis 19 is perpendicular to a reference axis that is parallel to the longitudinal barrel axis 13. In some embodiments, the second gyroscope 62 is positioned a longitudinal distance from the first gyroscope 52. The longitudinal distance in some embodiments is greater than about ten millimeters. By providing two gyroscopes positioned a longitudinal distance apart, the movement of the firearm body can be measured more precisely in some applications. Second gyroscope 62 can include multiple gyroscope sensors in some embodiments.

Figure 9B:
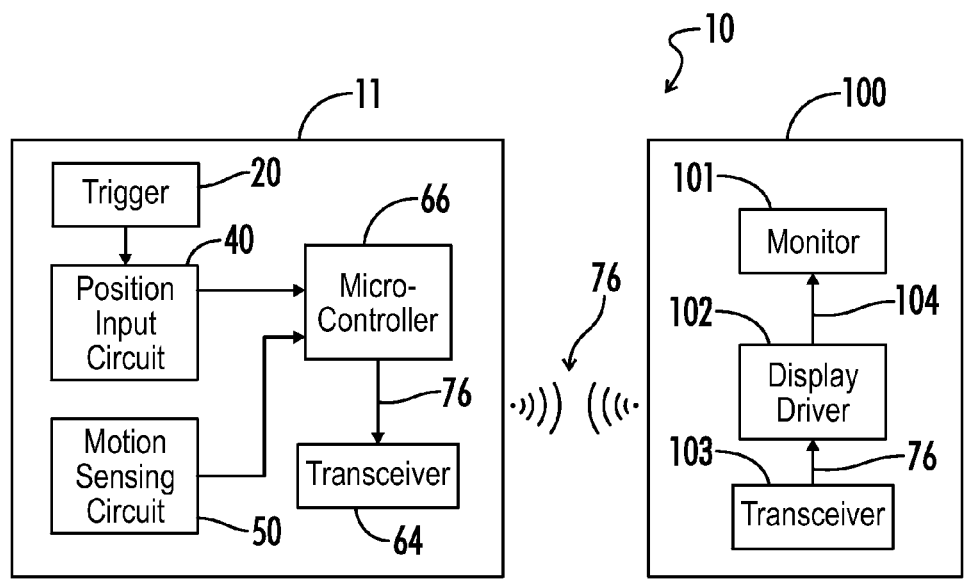
FIG. 9B illustrates an embodiment of a firearm system showing a wireless communication signal path between a firearm body and an electronic device.

Referring again to FIG. 9A, in some embodiments a communication signal 76 is transmitted to electronic device 100. Communication signal 76 can include digital or analog signals including information related to trigger position, trigger movement, linear movement of firearm body 11, rotational movement of firearm body 11, barrel displacement along at least two axes, or other information to be displayed on electronic device 100. Communication signal 76 can include an analog output signal, a digital output signal or both. In some embodiments, communication signal 76 is bidirectional. Communication signal 76 can pass to electronic device 100 via a wired communication signal path, as illustrated in FIG. 9A, or via a wireless communication signal path, as illustrated in FIG. 9B. Wireless signal transmission of communication signal 76 can operate using any type of wireless communication protocol known in the art, such as but not limited to serial or parallel wireless data transmission, TCP/IP communication, radio frequency communication, infrared radiation communication or combinations of these.

Referring to FIG. 9B, in some embodiments firearm body 11 includes a transmitter or transceiver 64. Transceiver 64 can be positioned on first printed circuit board 30 or on second printed circuit board 60. Additionally, transceiver 64 can be positioned at other locations on firearm body 11. Transceiver 64 in one embodiment includes a radio transmitter for transmitting communication signal 76 to a receiver based on electronic device 100. In some embodiments, transceiver 64 uses a frequency-hopping spread spectrum data transmission protocol, such as Bluetooth, to send data wirelessly to electronic device 100 via wireless communication signal 76. Electronic device 100 includes a corresponding receiver or electronic device transceiver 103 capable of receiving and processing the wireless communication signal 76. In some embodiments, firearm body transceiver 64 includes a radio transceiver capable of transmitting and receiving data in the 2.4 GHz industrial, scientific and medical radio frequency band. Communications circuitry including firearm body transceiver 64 can use any suitable communications protocol including Bluetooth, WIFI, 802.11, CDMA, GSM or other cellular or wireless communications protocols. In one embodiment, firearm body transceiver 64 includes a model WT11 Class 1 Bluetooth Module manufactured by Bluegiga Technologies of Espoo, Finland. It is understood that other models of transceivers or transmitters operable to use any suitable wireless data transmission protocol may also be attached to firearm body 11 for wirelessly transmitting a communication signal to electronic device 100.

Referring further to FIG. 9B, because Bluetooth devices, including transmitters, receivers and transceivers, exist in many electronics products, firearm body 11 including a Bluetooth-enabled transceiver 64 can communicate with various devices, including laptop computers, personal digital assistants, mobile cellular handset devices, tablet computers or other Bluetooth-enabled devices. In some embodiments, the firearm body 11 includes a Bluetooth transceiver that can be operated in a discoverable mode. When the firearm body 11 is within range of a Bluetooth-enabled host, such as a PC or a mobile cellular handset, a connection is initiated by the host. Communication between the Bluetooth-enabled host, i.e. personal computer or mobile cellular handset, and the transceiver 64 located on firearm body 11 is bi-directional in some embodiments. Data and status changes are sent from the firearm body 11 to the host. If controls or inputs are manipulated on the host, the changes are sent from the host to the firearm body 11. For example, a user may change software settings on the host electronic device 100 to adjust the difficulty level for the trigger pull measurement. The changed setting will be transmitted from the host to the firearm body 11 by the bidirectional communication signal 76, as illustrated for example in FIG. 14A.

Firearm body 11 communicates with the host through a virtual serial COM port on the host via the Bluetooth wireless communication protocol in some embodiments. The host can include multiple COM ports, and the proper COM port generally must be selected for proper data transmission between the firearm body 11 and the electronic device 100. In one embodiment, a graphical user interface (GUI), illustrated in FIG. 16 includes a port icon 91 for selection of the proper COM port. The COM port selection information can be stored on the host and will be automatically chosen when the same firearm body 11 is reconnected in a future session.

Referring again to FIG. 13, in some embodiments, second circuit board 60 is housed in stock 18. A battery 24 can also be housed in stock 18 in some embodiments. Battery 24 provides electrical power to circuitry in firearm body 11, including the position input circuit, the motion sensing circuit, and other circuits. In some embodiments, a power switch 22 is positioned on stock 18 for selectively powering the circuitry on firearm body 11. In one embodiment, power switch 22 is a rocker switch. Other types of switches known in the art can be used. In some embodiments, battery 24 is a rechargeable battery, and firearm body 11 includes a recharger plug 25 for connecting an external power source to firearm body 11 for recharging battery 24. In some embodiments, battery 24 can be a removable battery such as a conventional nine volt battery or a type AA, AAA, C, D, etc. or another type battery known in the art.

Figure 13:
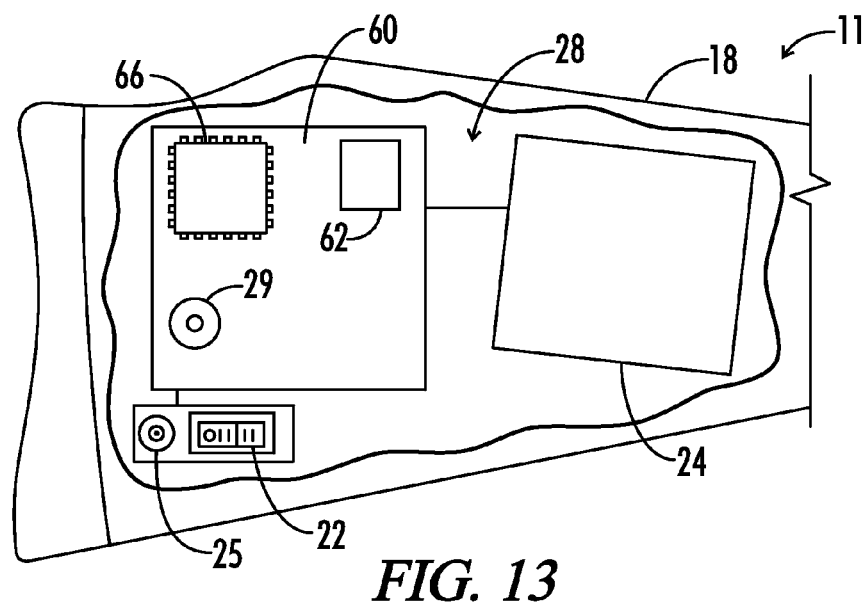
FIG. 13 illustrates a partially broken-away view of an embodiment of a shoulder stock on a firearm body.

Additionally, as seen in FIG. 13, in some embodiments, the firearm body 11 includes a buzzer 29. Buzzer 29 can be configured to be activated to emit an auditory signal detectable by the user when a successful or unsuccessful trigger pull is detected. For example, a user may select a sensitivity level for determining a successful trigger pull defining a maximum allowable lateral displacement boundary in either lateral direction along second axis 17. When the lateral movement of trigger 20 exceeds the maximum allowable lateral displacement boundary, an auditory signal is emitted by buzzer 29. In some embodiments, the firearm system 10 includes a buzzer control for selectively activating the buzzer feature. For example, a user may want to use the firearm system for monitoring firearm input information in a silent mode, so the buzzer feature can be deactivated using the buzzer control. In some embodiments, buzzer control is a virtual control including a buzzer icon 92 on graphical user interface 90.

Referring now to FIG. 15, in some embodiments, firearm body 11 stores data onto a computer readable storage medium 68, such as a flash memory device or the like, as illustrated generally in FIG. 15. In one embodiment, computer readable storage medium 68 includes a removable memory card such as a Secure Digital (SD) format memory card of the type manufactured by SanDisk of Milpitas, Calif. Data associated with one or more trigger pulls and/or barrel displacement data can be stored directly onto the computer readable storage medium 68. Generally, a data write signal 69 is sent from microcontroller 66 to computer readable storage medium 68 either during or following a trigger pull. The computer readable storage medium 68 device can then be removed from firearm body 11 and can be attached to a computer or other electronic device for analyzing or graphically displaying the stored information. Additional information can also be stored on computer readable storage medium 68, including for example trigger pull tension and trigger creep settings, ambient temperature, distance to target, yardage, windage, location or other information. In some embodiments, the computer readable storage medium 68 includes software operable for processing by microprocessor 66.

Referring again to FIG. 9A, in some embodiments electronic device 100 includes a monitor, or screen 101, for graphically displaying or monitoring information associated with firearm user input, i.e. trigger movement and/or barrel displacement. Screen 101 is attached to firearm body 11, as seen in FIG. 2 in some embodiments. In other embodiments, screen 101 is located on an external electronic device such as a cellular telephone, a television or a computer. As seen in FIG. 9A, a communication signal 76 is sent to electronic device 100. In some embodiments, a display driver 102 processes communication signal 76. Display driver 102 then sends a display signal 104 to monitor, or screen 101. In some embodiments, display driver 102 includes a graphics controller. For example, display driver 102 can include a model SSD1926 graphic controller manufactured by Microchip Technologies, Inc. of Chandler, Ariz. in some embodiments. In some embodiments, screen 101 is a backlit LCD display module adapted to receive display signal 104. Display driver 102 can include a backlight driver for the backlit LCD display module, for example a model LT1937 LED backlight driver such as that manufactured by Linear Technology of Milpitas, Calif. can be used with the monitor.

Figure 17:
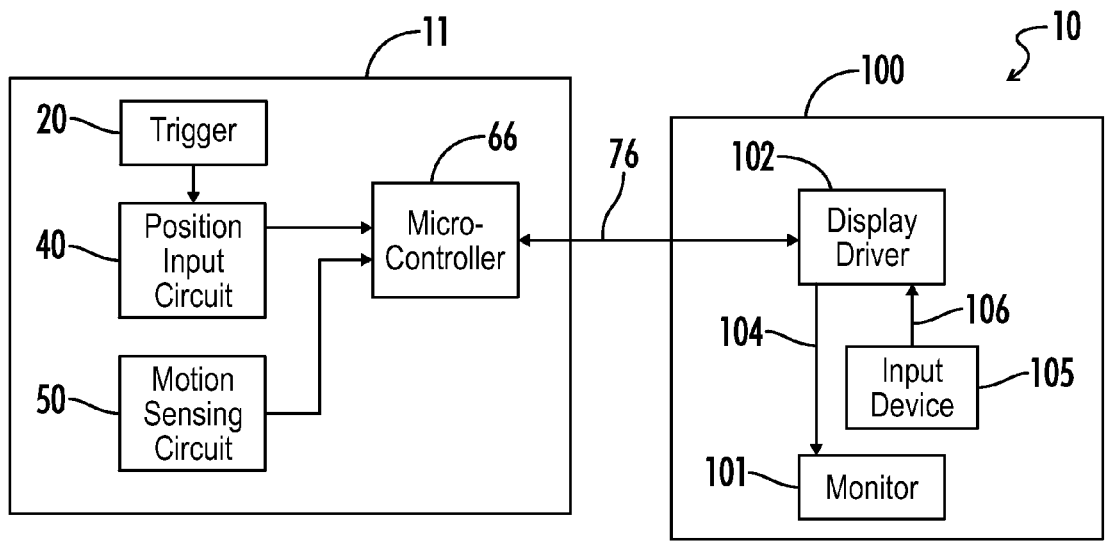
FIG. 17 illustrates an embodiment of a firearm system in accordance with the present invention.

Referring to FIG. 17, in some embodiments, electronic device 100 includes an input device 105. Input device 105 in some embodiments includes a touch screen input device. For example, in some embodiments, input device 105 is an overlay screen positioned on monitor 102. Input device 105 can receive user control input such as skill level, yardage, windage or projectile information such as bullet type, bullet mass, or amount of propellant. In some embodiments, communication signal 76 is a bidirectional signal, and user control input information entered using input device 105 is communicated to firearm body 11. For example, skill level information can be used to control buzzer 29, seen in FIG. 13. Similarly, user control input information can be stored on a computer readable storage medium 68 on firearm body 11, seen in FIG. 15. During use, in some embodiments, firearm system 10 includes the capability to store information associated with one or more trigger pulls as well as control input information. The stored information can be displayed sequentially or simultaneously in graphical or numeric format on display screen 101.

Figure 18:
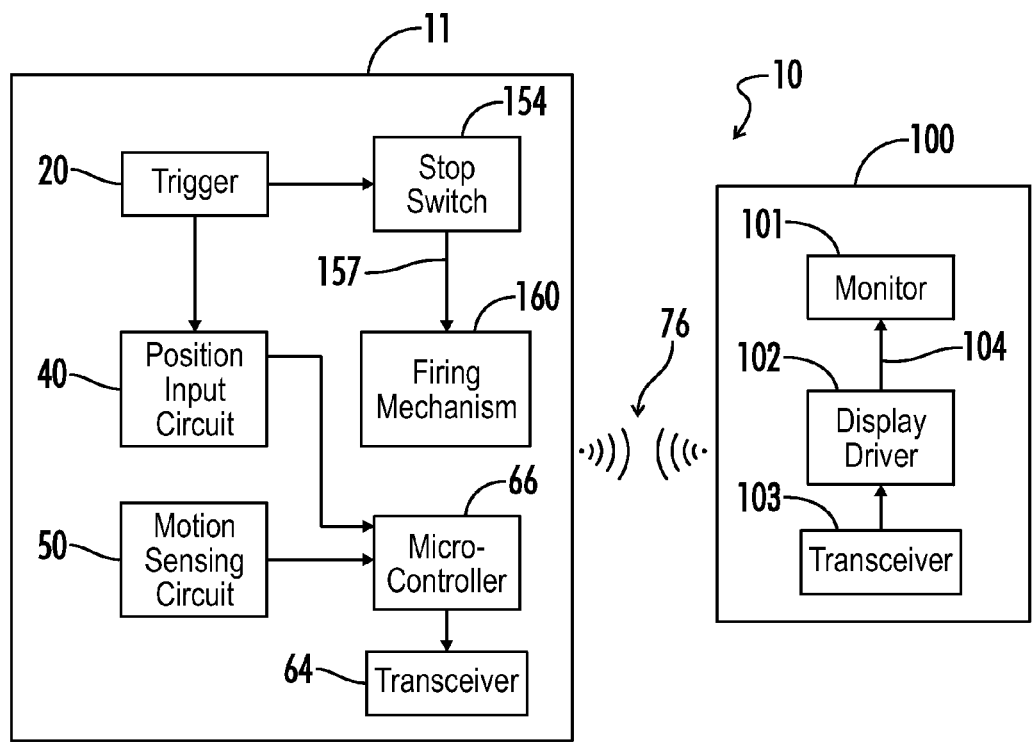
FIG. 18 illustrates an embodiment of a firearm system in accordance with the present invention.

Referring now to FIG. 18, in some embodiments, firearm body 11 includes a firing mechanism 160. Firing mechanism 160 can include an electronic component suitable for controlling a mechanical firing pin assembly in some embodiments. Firing mechanism 160 generally receives an input firing signal 157 from stop switch 154. Input firing signal 157 can include an analog voltage signal or a digital signal. When firing mechanism 160 receives the input firing signal 157, firing mechanism can be actuated to operate the mechanical firing pin assembly, thereby firing a shot of one or more projectiles from firearm body 11. In some embodiments, the trigger position and firearm body movement can be monitored during the trigger pull and/or throughout firing of the shot. By monitoring such information, the user can correlate trigger and/or barrel displacement measured by the circuitry on firearm body 11 to the actual trajectory taken by the fired shot. In some applications, a user can fire a plurality of shots from the firearm and the trigger movement and barrel displacement information associated with each shot can be stored on a computer readable storage medium for future analysis.

In additional embodiments, the present invention provides a method of providing firearm user input information to a user. The method includes the steps of: (a) providing a firearm including a firearm body and a trigger, a position input circuit including a multi-axis position controller; (b) pulling the trigger; (c) sensing movement of the trigger along at least two dimensions during the trigger pull; (d) communicating trigger movement information to a electronic device; (e) displaying on the electronic device a graphical trigger position indicator representation of the trigger pull path along at least two dimensions.

Thus, although there have been described particular embodiments of the present invention of a new and useful Firearm Trigger Pull Training System and Methods, it is not intended that such references be construed as limitations upon the scope of this invention except as set forth in the following claims.

What is claimed is:

1. A firearm training system for graphically indicating a two-dimensional trigger pull path of a firearm trigger to a user, the system comprising:
   a firearm body;
   a trigger on the firearm body, the trigger moveable relative to the firearm body along a two-dimensional trigger pull path, the trigger moveable in at least two dimensions including a longitudinal axis and a lateral axis during a trigger pull;

a position input circuit disposed on the firearm body, the position input circuit including at least one position sensor, the position input circuit operative to sense two-dimensional movement of the trigger along the trigger pull path;

the position input circuit configured to generate a trigger position signal representative of the actual two-dimensional trigger pull path taken by the trigger during a trigger pull;

a display in communication with the firearm training system, the display including a first Cartesian coordinate system representative of a physical plane of the firearm training system including the at least two dimensions the trigger is moveable in during a trigger pull; and a trigger position indicator associated with the trigger position signal graphed on the first Cartesian coordinate system on the display, the trigger position indicator representative of the actual two-dimensional trigger pull path taken by the trigger during a trigger pull.

2. The firearm training system of claim 1, wherein the trigger position indicator is plotted as a line on the display.

3. The firearm training system of claim 2, wherein the trigger position indicator includes a plurality of individual two-dimensional points connected by a line plotted on the display.

4. The firearm training system of claim 1, further comprising a microprocessor disposed on the firearm body, wherein the trigger position signal is input into the microprocessor.

5. The firearm training system of claim 4, further comprising a transceiver disposed on the firearm body, the transceiver operable to transmit a signal wirelessly from the microprocessor to the display.

6. The firearm training system of claim 1, further comprising a motion sensing circuit disposed on the firearm body, the motion sensing circuit configured to detect motion of the firearm body relative to a fixed reference frame.

7. The firearm training system of claim 6, wherein the fixed reference frame is a gravitational vector.

8. The firearm training system of claim 6, wherein the motion sensing circuit emits a firearm motion signal representative of movement of the firearm body.

9. The firearm training system of claim 8, wherein the firearm motion signal corresponds to linear translation of the firearm body.

10. The firearm training system of claim 9, wherein the firearm motion signal also corresponds to rotational motion of the firearm body.

11. The firearm training system of claim 8, further comprising a barrel displacement indicator associated with the firearm motion signal graphed on the display, the barrel displacement indicator representative of actual movement of the firearm body in at least two dimensions relative to the fixed reference frame.

12. The firearm training system of claim 11, further comprising a second Cartesian coordinate system shown on the display, the second Cartesian coordinate system representative of a physical plane of the firearm training system including at least two dimensions along which the firearm body may travel relative to the fixed reference frame.

13. The firearm training system of claim 12, wherein the barrel displacement indicator is graphed on the second Cartesian coordinate system on the display.

* * * * *